United States Patent
Hasler et al.

(10) Patent No.: US 8,028,799 B2
(45) Date of Patent: Oct. 4, 2011

(54) DAMPING DEVICE AND METHOD FOR DAMPING SOUND IN CAVITIES OF VEHICLES

(75) Inventors: Thomas Hasler, Troy, MI (US); Pierre Millet, Zurich (CH)

(73) Assignee: Sika Technology AG, Baar (CH)

( * ) Notice: Subject to any disclaimer, the term of this patent is extended or adjusted under 35 U.S.C. 154(b) by 707 days.

(21) Appl. No.: 11/587,741

(22) PCT Filed: Apr. 27, 2005
(Under 37 CFR 1.47)

(86) PCT No.: PCT/EP2005/051891
§ 371 (c)(1),
(2), (4) Date: Nov. 6, 2008

(87) PCT Pub. No.: WO2005/105405
PCT Pub. Date: Nov. 10, 2005

(65) Prior Publication Data
US 2010/0213001 A1    Aug. 26, 2010

(30) Foreign Application Priority Data

Apr. 27, 2004 (EP) .................................... 04101772

(51) Int. Cl.
*E04B 1/82* (2006.01)
(52) U.S. Cl. ......... 181/286; 181/287; 181/237; 181/204
(58) Field of Classification Search .................. 181/204, 181/286, 237; 277/626, 627
See application file for complete search history.

(56) References Cited

U.S. PATENT DOCUMENTS

| | | | |
|---|---|---|---|
| 4,479,992 A | 10/1984 | Haeseker et al. | |
| 4,874,650 A * | 10/1989 | Kitoh et al. | 428/68 |
| 4,898,630 A * | 2/1990 | Kitoh et al. | 156/79 |
| 4,977,018 A | 12/1990 | Irrgeher et al. | |
| 5,744,763 A * | 4/1998 | Iwasa et al. | 181/286 |
| 5,904,024 A | 5/1999 | Miwa | |

(Continued)

FOREIGN PATENT DOCUMENTS
EP    0 447 939 A1    9/1991

OTHER PUBLICATIONS

PCT/EP International Search Report for PCT/EP2005/051891, 4 pages (English Translation 3 pages).

*Primary Examiner* — Forrest M Phillips
(74) *Attorney, Agent, or Firm* — Rader, Fishman & Grauer PLLC

(57) ABSTRACT

A damping device and a method of damping a structural element of a vehicle body are disclosed. The damping device generally includes a carrier material, a separating material, and a damping material disposed on the carrier material. The damping material is one of a material forming an open cell structure and a material having an absorption coefficient for sound waves greater than about 0.5. The method generally includes fixing a damping device on a structural element of a vehicle, the damping device including a carrier material, a separating material, and a damping material, and one of expanding and dilating at least one of the separating material and the damping material, the damping material having one of an open cell structure and an absorption coefficient for sound waves greater than 0.5 after expansion.

18 Claims, 3 Drawing Sheets

U.S. PATENT DOCUMENTS

| | | | |
|---|---|---|---|
| 5,931,474 A * | 8/1999 | Chang et al. | 277/316 |
| 6,114,004 A | 9/2000 | Cydzik et al. | |
| 6,569,509 B1 * | 5/2003 | Alts | 428/73 |
| 6,923,499 B2 * | 8/2005 | Wieber et al. | 296/211 |
| 7,201,253 B2 * | 4/2007 | Duval et al. | 181/204 |
| 7,322,440 B2 * | 1/2008 | Khan et al. | 181/286 |
| 7,677,358 B2 * | 3/2010 | Tocchi et al. | 181/290 |

* cited by examiner

DAMPING DEVICE AND METHOD FOR DAMPING SOUND IN CAVITIES OF VEHICLES

CROSS-REFERENCE TO RELATED APPLICATIONS

This application is a National Phase application claiming the benefit of International Application No. PCT/US2005/051891, filed Apr. 27, 2005, which claims priority based on EP Application No. 04101772.4, filed Apr. 27, 2004, the complete disclosure of which is incorporated herein by reference.

TECHNICAL FIELD

The embodiments disclosed herein generally relate to a damping device for installation into or onto cavities of a motor vehicle.

BACKGROUND

Many car body parts contain cavities that must be sealed to prevent the admission of moisture and contaminating substances, for example, because such substances, particularly moisture, may lead to corrosion of the car body parts. This applies, in particular, to one-piece structures, in which a solid frame is replaced with a unit-body construction that generally contains a multitude of cavities which may accumulate moisture and contaminating substances. These cavities also serve as passages that transmit noise during operation of the vehicle. For example, the generally upright structure of a car body that forms the window opening generally includes an elongated passage or cavity that may collect moisture and contaminating substances and can also transmit undesirable noises. Injecting a sealant into the cavity is generally not satisfactory due to the insufficient sealing and damping provided by known sealing materials, the relatively high costs of such materials, and the irregular seals which known materials provide.

Additionally, the process of injecting foams into car body cavities is generally difficult to control precisely. Typically, an excess of foam must be introduced into the body cavity to adequately prevent the admission of moisture into the cavity while the vehicle is used. Foams also have a limited service life with respect to their flexibility before coagulation, so that the time available for introducing the foam into the cavity of the vehicle is restricted. Alternatives to these foams have been developed, such as other expandable materials which may be introduced into the cavities. Such materials dilate or expand, usually under the influence of heat. A heating process of this type usually takes place during the manufacture of car bodies in an electrocoating oven after the assembly of the bodyshell and the priming of the car body. In such instances, the expandable materials are generally introduced into the cavity together with a carrier material which fixes the expandable material at a certain location in the cavity.

However, known materials that fulfill requirements with respect to stability, durability and corrosion prevention generally do not have a favorable acoustic response in vehicle applications. These materials generally provide insufficient damping of the sound energy that may occur in the cavities during vehicle operation. The users of the vehicles may perceive this as particularly annoying. Noise may be merely sealed off within vehicle cavities by such known materials and expansion-molded parts, i.e., no sound energy is absorbed. Accordingly, there is a need for a material which provides improved sealing and acoustic properties.

SUMMARY

A damping device which may be installed into or onto a cavity of a motor vehicle is disclosed. The damping device generally includes a carrier material, a separating material and a damping material. The damping material may be provided on the carrier material, and has an open cell structure or an absorption coefficient for sound waves greater than approximately 0.5. The damping device provides a highly effective seal and acoustically damps the structural element.

Additionally, a method for fixing a damping device for a cavity of a vehicle is disclosed. The method generally includes providing a damping device comprising a carrier material, a separating material and a damping material on a structural element, and dilating or expanding the separating material and the damping material.

BRIEF DESCRIPTION OF THE FIGURES

Embodiments are described in greater detail below with reference to the figures. Identical elements are identified by the same reference numbers in the different figures.

The figures show.

DETAILED DESCRIPTION

Figure 1:
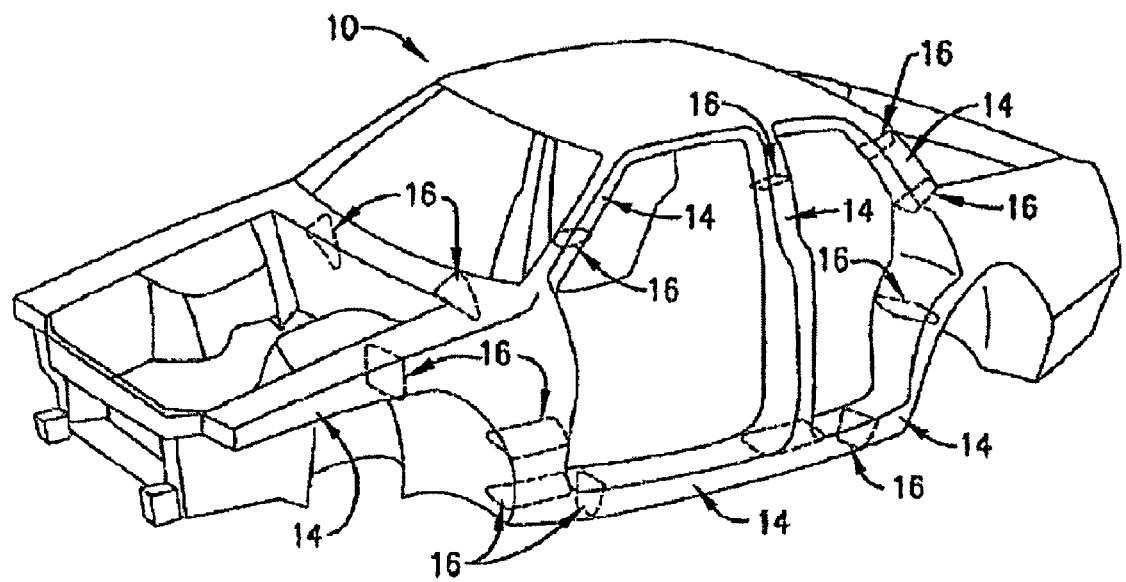
FIG. 1, a schematic perspective representation of a car bodyshell.

The reference number 10 in FIG. 1 identifies a car bodyshell. Such a car body usually has a plurality of structural elements 14, for example, the A-column, the B-column and the C-column that extend longitudinally and typically form one or more cavities—at least in a section thereof. Damping elements 16 may run transverse to the longitudinal direction of the structural element 14, as indicated with arrows at several locations in FIG. 1. Their function generally includes sealing off the cavities to substantially prevent gases, vapors, liquids or other substances from intruding into the cavities.

Figure 2:
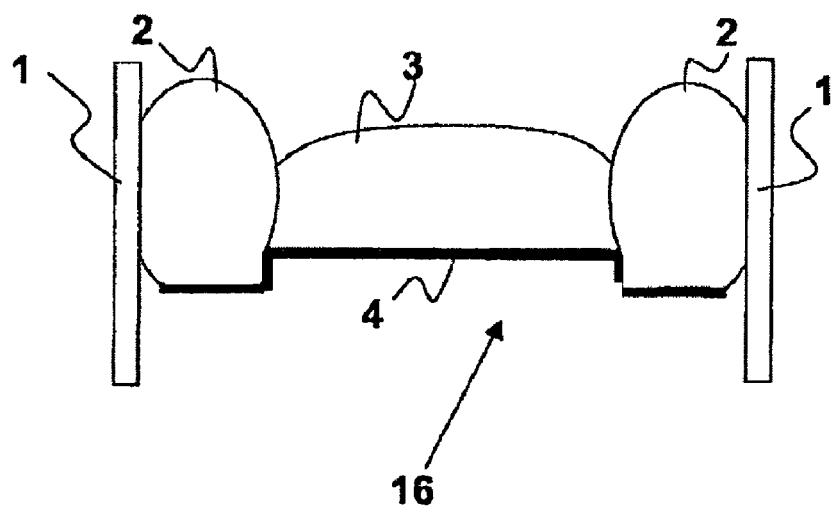
FIG. 2, a schematic representation of a damping device that is arranged between two walls of a structural element, wherein the expandable components of the damping device are expanded, according to an embodiment.

FIG. 2 schematically shows such a damping device 16 according to an embodiment. The damping device 16 includes a carrier material 4, a separating material 2 and a damping material 3. The damping device 16 is arranged between two walls 1 of the structural element 14, the expandable materials 2, 3 of the damping device 16 being illustrated in an expanded state. Before the damping device 16 is mounted in the structural element 14, i.e., between the two walls 1, the separating material 2 and the damping material 3 may preferably lie comparatively flat on the carrier material 4 (see FIG. 5). Carrier material 4 may be additionally connected to the wall 1 or the structural element 14, respectively, by means of one or more snap-on fastening elements (not shown).

Figure 3:
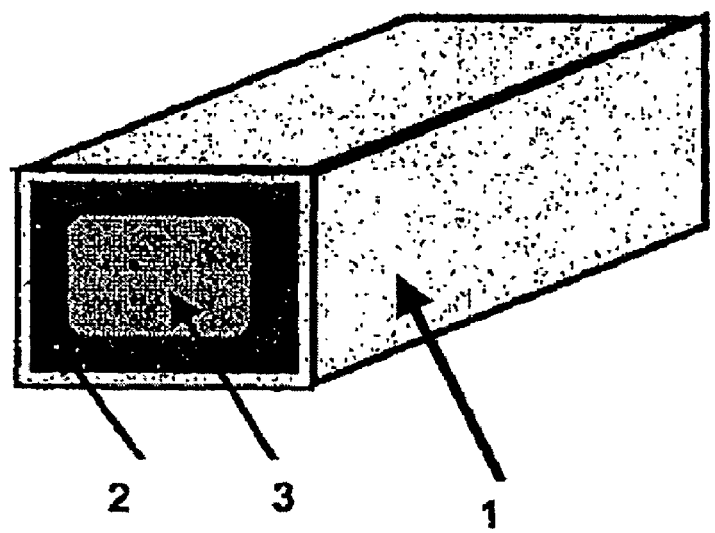
FIG. 3, a schematic representation of a cavity in the form of a tube filled with absorption material and damping material, according to an embodiment.

FIG. 3 is a schematic representation of an example of a completely filled cavity in a structural element 14 in the form of a tube filled with absorption material and damping material. This figure shows the outer wall 1 of the structural element 14, the inwardly adjacent separating material 2 and the damping material 3 that is also referred to as absorption material 3 in the interior.

Figure 4A:
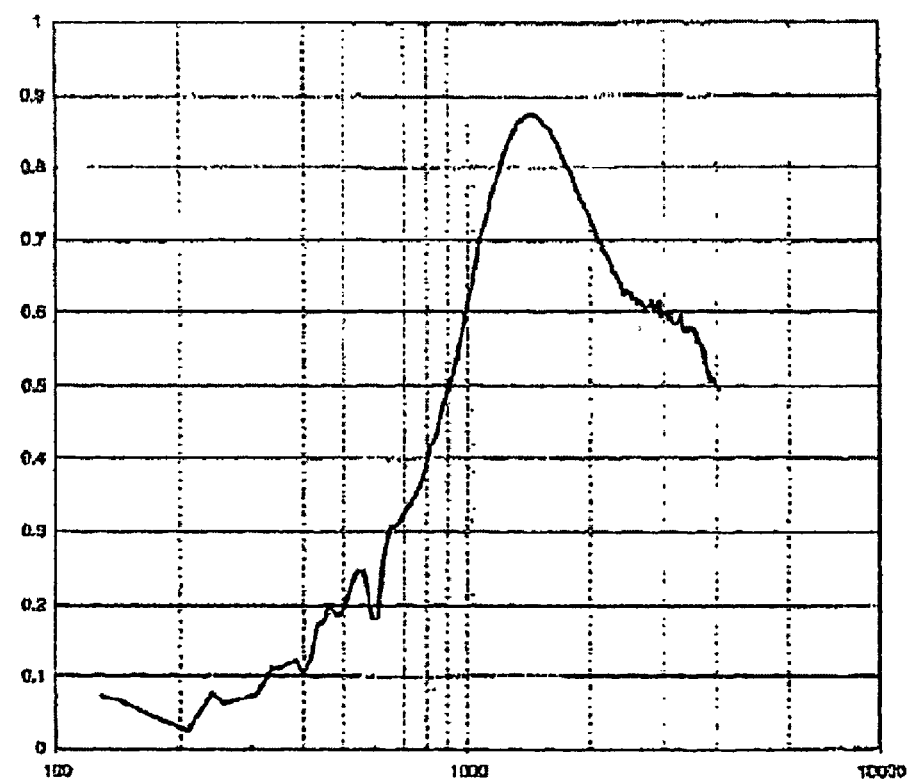
FIG. 4, illustrates a frequency response plot showing an absorption characteristic of materials which may be used in the damping device of FIG. 3, and FIG. 5, a schematic representation of a damping device that is arranged between two walls of a structural element, wherein the expandable components of the damping device are not yet expanded, according to an embodiment.

FIG. 4a shows a frequency response of one embodiment of damping material 3. In the illustration in FIG. 4a, the frequency is logarithmically plotted on the abscissa in Hertz.

Figure 4B:
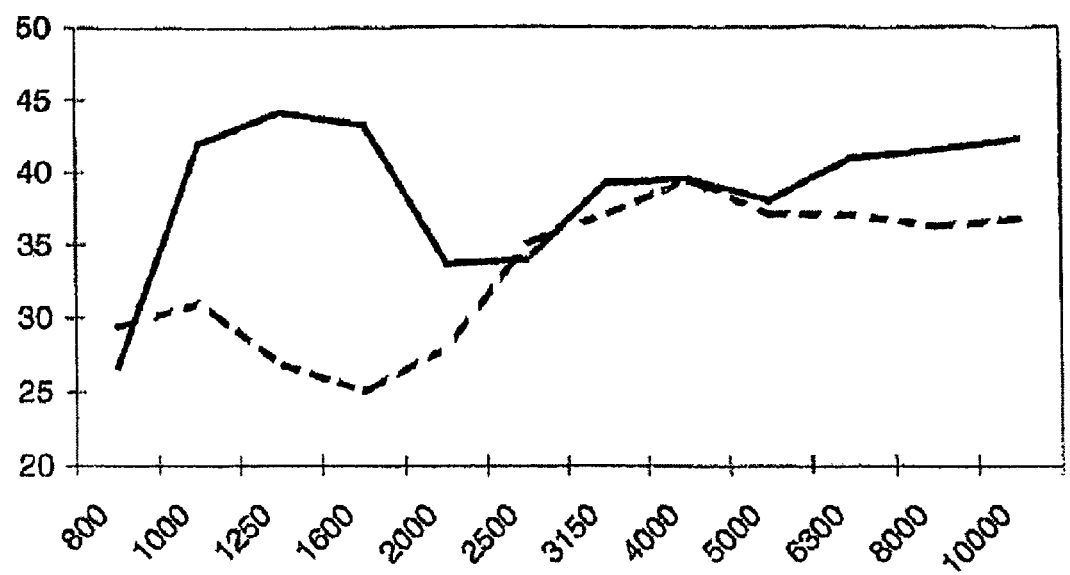

FIG. 4b shows a frequency response of two damping devices. The dashed line in FIG. 4b shows a frequency response of a damping device 16 without a damping material 3, and the solid line in FIG. 4b shows a frequency response of a damping device 16 with a damping material 3 included. In the illustration in FIG. 4b, the frequency is plotted linearly on the abscissa in Hertz and the dissipation factor is plotted in decibels on the ordinate. Therefore, the solid line in FIG. 4b represents an overall frequency response characteristic of a damping device 16. The two frequency responses shown in FIG. 4b and a comparison between these frequency responses shows that the dissipation factor of an arrangement with a damping material 3 is greater than 40 dB at least over the entire frequency range between 1 kHz and 2 kHz. Therefore the addition of damping material 3 consequently results in substantially improved acoustic properties in comparison with an embodiment of the damping device 16 provided without damping material 3.

Figure 5:
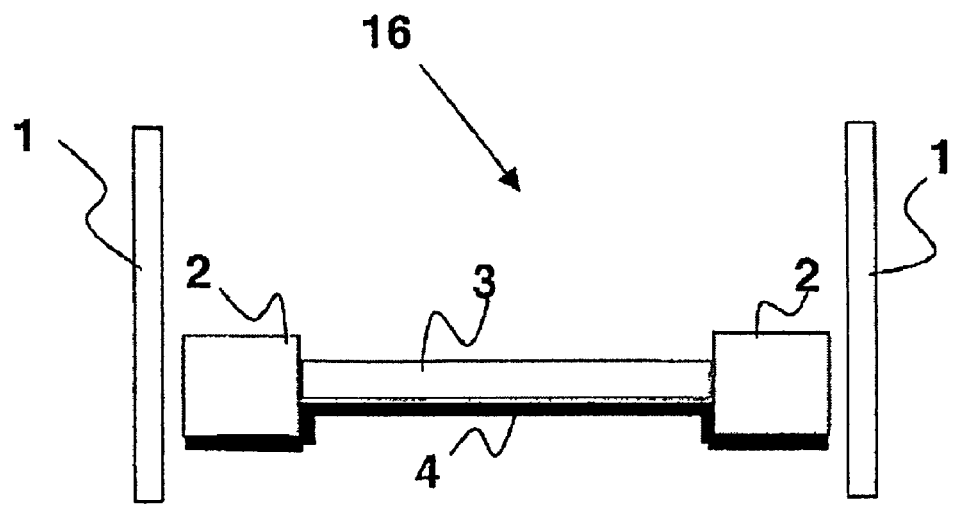

FIG. 5 shows a schematic representation of an embodiment of a damping device 16 that is slightly modified in comparison with FIG. 2 and arranged between two walls 1 of the structural element 14, wherein the expandable components 2, 3 of the damping device 16 are not yet expanded.

FIGS. 2 and 5 show cross sections that extend along structural element 14 containing a cavity between the walls 1. In this context, the connection between the damping device 16 and a wall 1 by means of the separating material 2 should be considered to seal off or separate an entire cross-section of the cavity. The damping material 3 is then arranged in the interior or in the center of such a cross section.

The damping device 16 may be formed as a prefabricated expansion-molded part introduced into a cavity in a car body, particularly of a road vehicle, and fixed therein, or fixed within a cavity of the car body. The damping device 16 generally includes at least one carrier material 4, a damping material 3 and a separating material 2. The different materials of the damping device 16 can either be connected to one another in a multi-stage injection molding process or these materials may be fabricated separately and subsequently connected to one another. For example, it is also possible to process, in particular, the carrier material 4 and the separating material 2 together in a two-stage injection molding process, in which case damping material 3 is subsequently applied or affixed, for example, by means of bonding. The damping device may then be fixed to a structural element of a vehicle, such as in or on a wall of the structural element, by, for example, a snap-on fastening element arranged on the carrier material. The damping device may thus by fixed on the structural element or its wall in a reproducible and stable fashion before the expansion of the separating material and the damping material. At least one of the damping material 3 and the separating material 2 may be dilated or expanded, such as by thermal expansion in an electrocoating oven. The expanded damping device generally seals the structural element or a cavity formed by the structural element against moisture, dust, air and other undesirable contaminants, and attenuates noise that would otherwise be transmitted through the cavity. The expansion of the damping material 3 and/or separating material 2 may generally divide a cavity of the vehicle body, generally allowing more sound energy to be absorbed. Sound energy consequently is converted into heat, thereby reducing noise. Additionally, corrosion prevention materials may be employed with the damping device at the boundary between the separating material and the structural element.

The separating material and/or the damping material may be dilated or expanded, such as by thermal expansion. The expansion or dilation of the separating material and/or the damping material may be controlled to prevent direct contact between the damping material and a wall of the structural element. This may preserve advantageous acoustic properties while counteracting a possibly tendency of a damping material to absorb moisture and/or corrosion as a result of contact with the structural element.

If a wall of the structural element comes in contact with the separating material, corrosion of the wall is preferably prevented or at least inhibited, particularly with respect to edge corrosion and bottom corrosion. Consequently, the damping device may be utilized in a particularly cost-efficient fashion analogous to that known for expandable materials.

The damping material may have an absorption coefficient for sound waves of at least 0.8—particularly in at least the frequency range between approximately 1 kHz and approximately 5 kHz. This frequency range is particularly relevant to motor vehicles, such as cars and trucks, because acoustic noise in this frequency range is perceived as particularly annoying to vehicle operators—this is also associated with the increased sensitivity of the human ear in this frequency range—and road vehicles contain particularly intense sources of sound in this frequency range. However, embodiments having damping materials with sound absorption coefficients of less than 0.8 may be utilized.

The separating material may have a closed cell structure, and a water absorption of less than approximately 10%, preferably less than approximately 5%, particularly less than approximately 4%, and more particularly less than approximately 3%. This may reduce susceptibility of the separating material to corrosion at the boundary between the separating material and the structural element or its wall, respectively. In addition, the separating material may be more stable and durable because it is not susceptible to decomposition.

The acoustic properties can be significantly improved if the damping material 3 has an open cell structure. This means that different pores of the material are connected to one another. Sound energy is particularly effectively converted into heat in such a damping material 3. As an alternative to an open cell structure, a damping material 3 having an absorption coefficient for sound waves greater than approximately 0.5, particularly in the frequency range between approximately 1 kHz and approximately 2 kHz, may be employed. However, materials having an open-cell structure may be more susceptible to absorbing water or moisture. Consequently, an open-cell material is preferably prevented from coming into contact with corrodible surfaces or walls 1.

In one embodiment, carrier material 4 includes a light and stable non-corrosive material such as polyamide. It is particularly preferred to use Nylon PA 6.6 that is also manufactured from reusable materials of known origin. With respect to the carrier material 4, the mechanical properties are of particular importance, for example, the notched bar impact value, the elasticity, the elongation at fracture or elongation at break, the elongation due to bending, the softening temperature and the moisture absorption capacity. The carrier material is preferably suitable for being processed into 3-dimensional injection-molded parts with sufficient stability for holding and fixing the other materials of the damping device 16, particularly the damping material 3 and the separating material 2, up to and during their expansion, as well as for fixing the damping device 16 relative to the structural element 14. The viscosity in a molten state should also be considered for the processing or shaping of the carrier material. Naturally, other materials with identical or similar properties may also be used as carrier material 4.

In one embodiment, damping material 3 may include, in particular, a foam with open-cells (after the expansion), for example, as in the products SikaBaffle R 229 or SikaBaffle R 293 (available from SIKA AG, Switzerland). Before the expansion, the damping material is present, in particular, in the form of a rubber-based, extruded acoustic sealant that can be thermally expanded. The material SikaBaffle R 229, for example, comprises two co-extruded material layers, wherein the bottom layer consists of a black, sticky and non-reactive adhesive layer with a density, for example, of 1.2 kg/dm$^3$ and the other (expandable) layer consists of a dark gray, slightly sticky and highly expandable expansion layer with a density, for example, of 1.5 kg/dm$^3$. The material SikaBaffle R 229 has a very high expansion capacity of more than 900%, excellent sound-absorbing properties, i.e., sound-damping properties, is self-adhesive, and can also be cut to the required size beforehand and has a soft consistency in order to also produce full-surface contact with irregular surfaces. This material furthermore has superior adhesive properties on oily metal and oily, phosphated and/or electrocoated surfaces, adequate aging properties and is non-toxic. Such a material preferably has the following properties: it expands by more than 600% within 30 minutes at 150° C., by more than 900% within 30 minutes at 165° C. and by more than 900% within 30 minutes at 180° C.; the vertical/horizontal expansion ratio (vertical rise/ramp expansion, 4° ramp angle) exceeds 600% in this case. The material is suitable for use at temperatures between −30° C. and 70° C., resistant to water, salt water and lubricating oils, has a water absorption of less than 5% (after the expansion) and an ignition point (according to ASTM D92, COC) that lies above 200° C. Naturally, other materials with identical or similar properties may also be used as damping material 3.

In one embodiment, separating material 2 may include a thermoplastic or injection-molded part such as the materials SikaBaffle R 250 or SikaReinforcer R 911 PB (available from SIKA AG, Switzerland). Materials of this type are preferably arranged on the carriers in the bodyshell of the car body, for example, in the cavities of the A-column, B-column and C-column, the roof frame and/or the body sill in the form of molded parts. The damping device is functional after the dilation (expansion) in the electrocoating oven (KTL oven).

The material SikaBaffle R 250 generally provides a tight seal for cavities with complex shapes and is compatible with all standard products used in the process sequence following the assembly of the bodyshell. This material is also odorless, compatible with paints and does not contaminate the electrocoating bath (KTL bath). In addition to the aforementioned properties, the material SikaReinforcer R 911 PB increases the rigidity of the car body and the car body cavities. Both materials have, in particular, superior corrosion-preventing or corrosion-delaying properties with respect to adjacent or adjoining metal parts—particularly walls 1 of structural elements 14—such that a corrosion protection of more than 1000 hours in the salt spray bath or 10 Rd VDA is achieved and neither edge corrosion nor bottom corrosion occurs. The water absorption capacity amounts to less than 4% (depending on the test method).

Reference in the specification to "one embodiment" or "an embodiment" means that a particular feature, structure, or characteristic described in connection with the embodiment is included in at least one embodiment. The phrase "in one embodiment" in various places in the specification does not necessarily refer to the same embodiment each time it appears.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claimed invention.

Accordingly, it is to be understood that the above description is intended to be illustrative and not restrictive. Many embodiments and applications other than the examples provided would be apparent to those of skill in the art upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their broadest reasonable constructions and their ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

The invention claimed is:
1. A damping device comprising:
a carrier material; and
a separating material secured to a surface of the carrier material;
wherein the damping device may be fixed to a structural element of a vehicle, and further wherein the damping device includes a damping material secured to the surface of the carrier material, and further wherein the damping material is one of a material forming an open cell structure and a material having an absorption coefficient for sound waves greater than about 0.5, wherein the damping material and separating material are each disposed on a same side of the carrier; and
wherein at least one of the separating material and the damping material is expandable, wherein the damping material is secured to the surface of the carrier material along a first side of the damping material, and the damping material is exposed along a second side opposite the first side to allow expansion of the damping material within the structural element.

2. The damping device of claim 1, wherein at least one of the separating material and the damping material is thermally expandable.

3. The damping device of claim 2, wherein the expansion of the separating material prevents direct contact between the damping material and a wall of the structural element.

4. The damping device of claim 1, wherein the damping material has an absorption coefficient for sound waves of at least 0.8.

5. The damping device of claim 3, wherein the separating material contacts the wall of the structural element, thereby inhibiting corrosion of the wall.

6. The damping device of claim 1, wherein the separating material forms a closed cell structure.

7. The damping device of claim 1, wherein the separating material has a water absorption capacity of less than about 10%.

8. The damping device of claim 1, wherein the separating material has a water absorption capacity of less than about 5%.

9. The damping device of claim 1, wherein the separating material has a water absorption capacity of less than about 4%.

10. The damping device of claim 1, wherein the separating material has a water absorption capacity of less than about 3%.

11. The damping device of claim 1, wherein the damping device is configured to be fixed to the structural element.

12. A method, comprising:
fixing a damping device on a structural element of a vehicle; wherein the damping device includes a carrier material, a separating material, and a damping material, the separating material and the damping material secured to a surface of the carrier material, the separating material and the damping material disposed on a same side of the carrier material;
one of expanding and dilating at least one of the separating material and the damping material;
establishing at least one of the separating material and the damping material as expandable; and
securing the damping material to the surface of the carrier material along a first side of the damping material, such that the damping material is exposed along a second side opposite the first side to allow expansion of the damping material within the structural element
wherein the damping material has one of an open cell structure and an absorption coefficient for sound waves greater than about 0.5 after expansion.

13. The method of claim 12, wherein expansion of the at least one of the separating material and the damping material includes expanding the separating material and the damping material, wherein the separating material is expanded at a first temperature, and the damping material is expanded at a second temperature.

14. The method of claim 12, wherein the one of expanding and dilating at least one of the separating material and the damping material comprises thermally expanding at least one of the separating material and the damping material.

15. The damping device of claim 1, wherein at least one of the separating material and the damping material is expandable, and the separating material is positioned about the damping material to prevent contact between the damping material and an outer edge of the carrier such that the separating material prevents the damping material from contacting the structural element after expansion.

16. The method of claim 12, further comprising:
establishing at least one of the separating material and the damping material as expandable; and
positioning the separating material about the damping material to prevent contact between the damping material and an outer edge of the carrier, such that the separating material prevents the damping material from contacting the structural element after expansion.

17. A damping device comprising:
a carrier material; and
a separating material secured to a surface of the carrier material;
wherein the damping device may be fixed to a structural element of a vehicle, and further wherein the damping device includes a damping material secured to the surface of the carrier material, and further wherein the damping material is one of a material forming an open cell structure and a material having an absorption coefficient for sound waves greater than about 0.5, wherein the damping material and separating material each disposed on a same side of the carrier;
wherein at least one of the separating material and the damping material is expandable, and the separating material is positioned about the damping material to prevent contact between the damping material and an outer edge of the carrier such that the separating material prevents the damping material from contacting the structural element after expansion; and
wherein the damping material is secured to the surface of the carrier material along a first side of the damping material, and the damping material is exposed along a second side opposite the first side to allow expansion of the damping material within the structural element.

18. The damping device of claim 17, wherein at least one of the separating material and the damping material is thermally expandable.

* * * * *